Jan. 31, 1939.  J. W. FOUTCH  2,145,510
BATTERY WATER GAUGE
Filed April 5, 1938  3 Sheets-Sheet 1
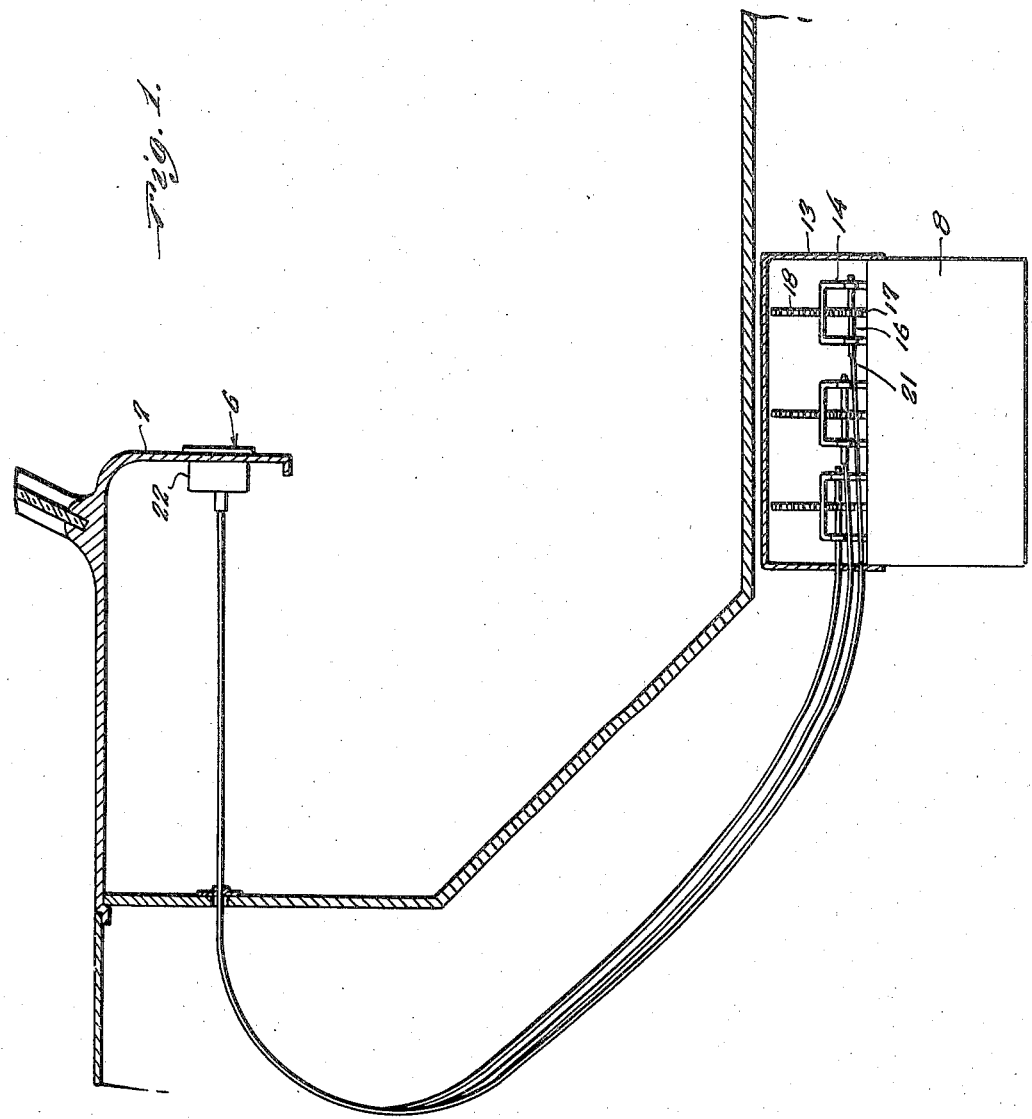
Inventor
J. W. Foutch
By Clarence A. O'Brien
and Hyman Berman
Attorneys

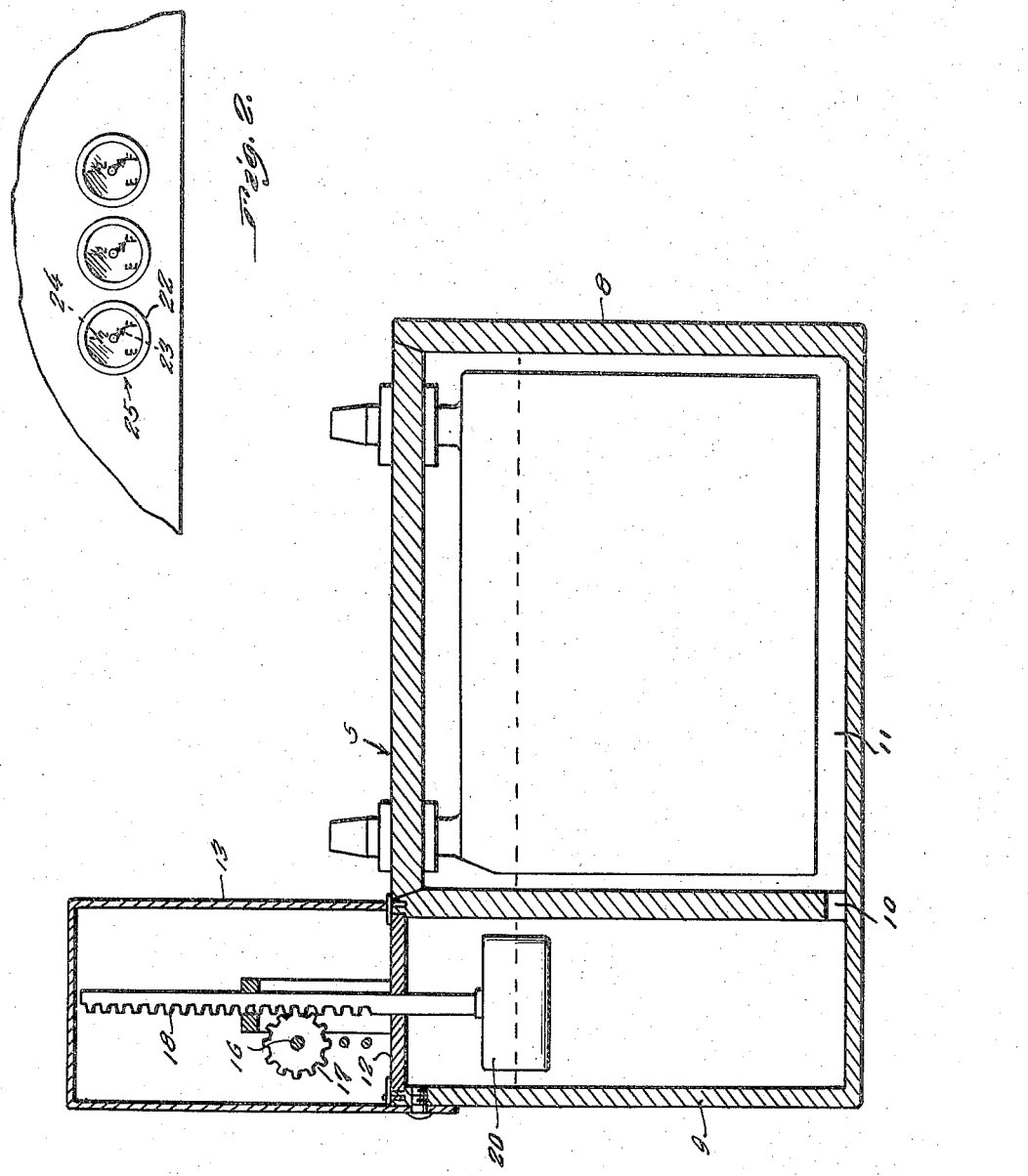

Jan. 31, 1939. J. W. FOUTCH 2,145,510
BATTERY WATER GAUGE
Filed April 5, 1938 3 Sheets-Sheet 3
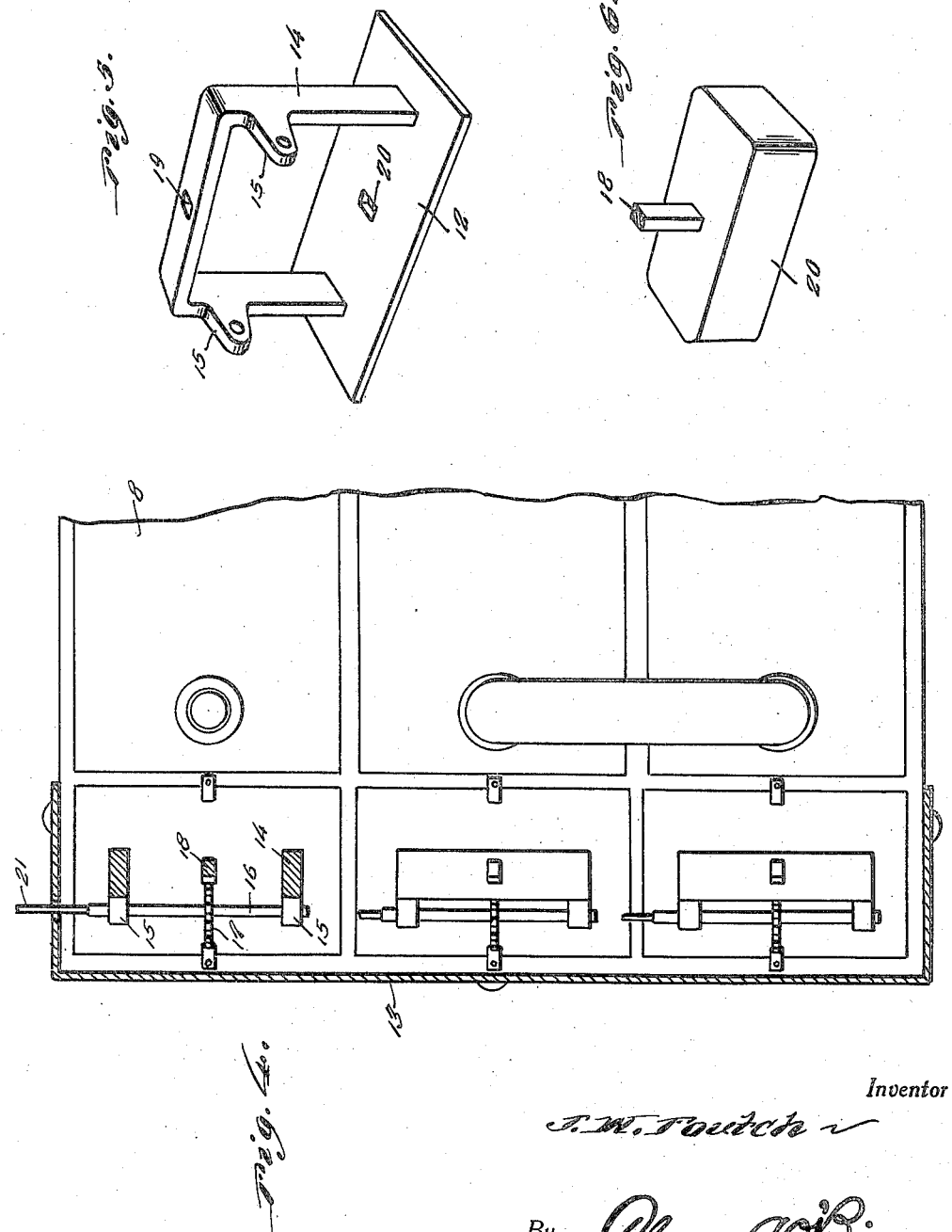
Inventor
J. W. Foutch
By Clarence A. O'Brien
and Hyman Berman
Attorneys Patented Jan. 31, 1939

2,145,510

UNITED STATES PATENT OFFICE 2,145,510

BATTERY WATER GAUGE

John William Foutch, Oklahoma City, Okla.

Application April 5, 1938, Serial No. 200,216

2 Claims. (Cl. 73—321)

This invention appertains to new and useful improvements in gauges and more particularly to a gauge especially adapted for use on automobiles for indicating the water level of the cells of the usual battery.

The principal object of the present invention is to provide a simple and inexpensive appliance whereby the water level of the battery cells can be determined at a glance.

Other objects and advantages of the invention will become apparent to the reader of the following specification.

In the drawings:

Figure 1 represents a fragmentary vertical sectional view through a portion of an automobile showing the battery and gauge structure.

Figure 2 is a fragmentary front elevational view showing the gauges.

Figure 3 is a vertical sectional view through the battery assembly.

Figure 4 is a horizontal sectional view.

Figure 5 is a perspective view of one of the rack guides and gear supports.

Figure 6 is a perspective view of the float member.

Referring to the drawings wherein like numerals designate like parts, it can be seen that numeral 5 generally refers to the battery assembly, while numeral 6 represents the gauges on the instrument board 7.

The battery assembly consists of a battery structure 8 which in the present instance has three cells. This battery structure is formed with a case having the extended portion 9 divided into separate cells and each cell is in communication by way of a by-pass 10 with its complementary battery cell 11.

Each of the cells of the extension 9 is provided with a closure plate 12 having means whereby the same can be removably secured in place and over this extension 9 is disposed the hood 13.

On each of the closures 12 is an inverted U-shaped frame 14 having laterally disposed apertured ears 15 on its leg members. Disposed through these apertured ears is a shaft 16 on which is the gear 17 which meshes with the rack 18 slidably disposed through an opening 19 in the closure plate 12. The lower end of this rack 18 operates in the corresponding cell of the extension 9 where it is equipped with a float 20.

One end of each of the shafts 16 has a flexible shaft 21 attached thereto and these flexible shafts extend through flexible conduits to the indicators 6, each indicator consisting of a case 22 through the back of which is disposed the flexible shaft, the forward end of the flexible shaft carrying a pointer 23 operative in front of a dial 24.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A battery liquid contents level indicator comprising a battery case, an auxiliary chamber at one side of the battery, a float operative in the auxiliary chamber, said auxiliary chamber being in communication with the interior of the battery case, a removable cover plate for the auxiliary chamber, a hood removably secured to the auxiliary chamber over the said plate, said plate having an opening therein, a rack extending upwardly from the float and through the opening in the cover plate, an inverted U-shaped bracket on the cover plate provided with laterally extending bearing structures on the leg portions thereof, the upper portion of the inverted U-shaped bracket being formed with an opening overlying the opening in the cover plate and through which the rack slidably extends, a shaft journaled through the bearings and through one side of the hood, and a gear on the shaft meshing with the rack.

2. An indicator drive for secondary batteries comprising a battery case having a plurality of cells, an auxiliary chamber for each of the cells, said auxiliary chambers being aligned, a float in each of the chambers, a removable cover plate for each of the chambers, an inverted U-shaped bracket on each of the cover plates, each of the brackets having laterally extending bearing members, racks extending upwardly from the floats and through the cover plates and brackets, a shaft journaled through the bearings of each bracket, a gear on each of the shafts meshing with its corresponding rack, a hood for disposition over the auxiliary chambers, said hood at one end being provided with vertically spaced openings, the bearings of each bracket being disposed on a horizontal plane different from the planar dispositions of the other bearings, said shafts being disposed through the vertically spaced openings in the hood.

JOHN W. FOUTCH.